G. A. WINDUS.
DEHORNING APPARATUS.
APPLICATION FILED FEB. 20, 1912.
1,067,451.
Patented July 15, 1913.
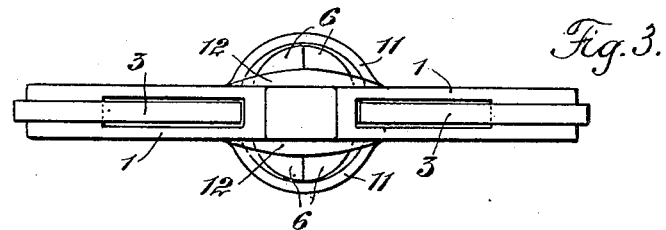
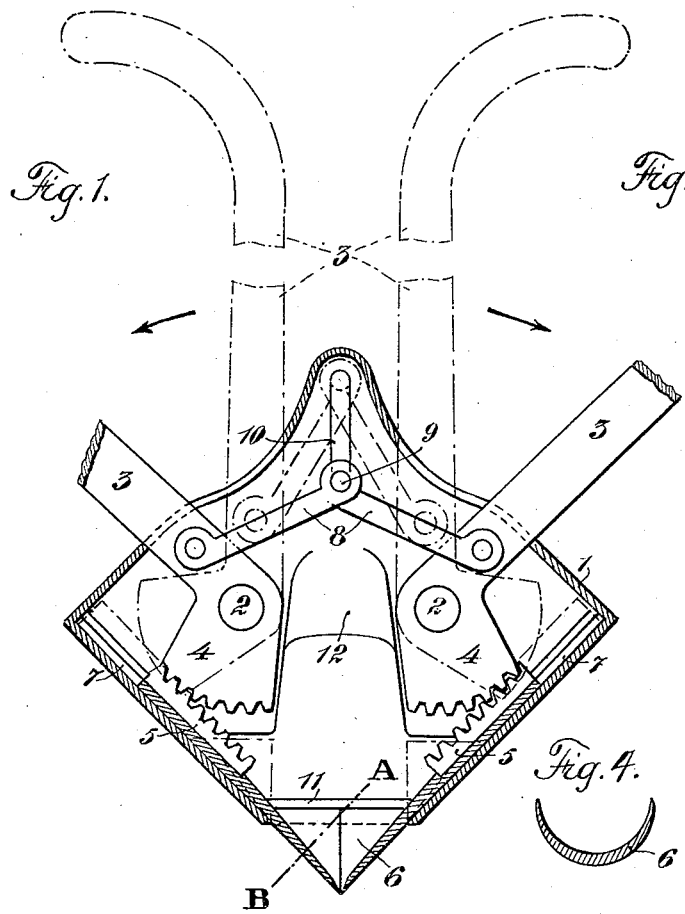
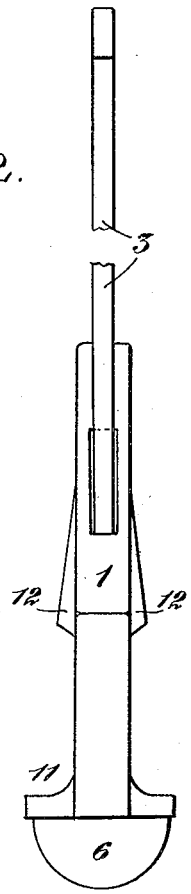

UNITED STATES PATENT OFFICE.

GERALD ARTHUR WINDUS, OF BUENOS AIRES, ARGENTINA.

DEHORNING APPARATUS.

1,067,451.  Specification of Letters Patent.  Patented July 15, 1913.

Application filed February 20, 1912. Serial No. 678,769.

*To all whom it may concern:*

Be it known that I, GERALD ARTHUR WINDUS, a subject of the King of Great Britain and Ireland, residing at No. 745 Calle Tucuman, Buenos Aires, Argentina, have invented a new Dehorning Apparatus, of which the following is a specification.

The present invention relates to a novel dehorning apparatus which offers the advantage of requiring only a small amount of force for its operation and which cuts off the horn with a concave cut, as near as possible to its root.

As will hereinafter be more fully explained, the apparatus essentially consists of a casing or head of peculiar shape in the interior of which is mounted the whole of the mechanism. Two lever arms, connected together in their movement and the fulcrum of which is in the interior of said casing, form at their lower end, a toothed sector engaging with a rack wherein is fixed the respective knife. The knives are of semicircular section and owing to the action of the said racks and sectors, they effect the cut by simultaneously advancing one toward the other until their cutting edges meet. In this arrangement, both knives form a right angle and the union of both coincides with the longitudinal center of the apparatus and with the bisecting line of said angle.

For the clearer understanding of this invention, this specification is accompanied by detailed drawings, wherein:

Figure 1 represents a partial section of a dehorning apparatus constructed in accordance with my invention. Figs. 2 and 3 respectively show a side elevation and a plan view of the same. Fig. 4 shows a knife on the line A—B of Fig. 1.

In said drawings, 1 is the casing in which by means of the studs 2 are centered the lever arms 3 which at their lower end form the toothed sectors 4 which engage with the racks 5 fixed at the rear extension of the knives 6, guided in their movement by the lower parts of the casing and the lateral grooves 7.

The lever arms 3 are connected together in their movement in such a way that one of them may not be moved without the other one effecting the same movement, although in the inverse direction. This is owing to the fact that each lever arm is provided with two rods 8, the rods of one arm being jointed to those of the other and the central jointing stud 9 thereof is guided in its movement by the openings 10 formed one at each side of the casing.

At the lower part of the casing a strengthening ring 11 is provided which serves at the same time for guiding the apparatus in order that the same may be easily placed in the position most convenient for effecting the cut. An opening formed at each side of the casing and which at its upper part is limited by a beading or boss 12 formed in the same, permits of the ready and total insertion of the horn.

The operation of the apparatus is as follows: The arms 3 being in the position shown with dotted lines in Fig. 1, the knives reach their position of maximum separation and allow of the ring 11 being inserted up to the root of the horn. After placing the apparatus onto the horn, the arms 3 are separated as shown at Fig. 1, which movement will cause the sectors 4 to move the rack 5 and in consequence the knives 6 will approach each other until their respective cutting edges meet. As will be seen, the sectional shape of the knives and the movement in right angle which one of them effects with regard to the other, will determine a concave cut, that is to say, a cut of a greater depth at the center of the horn than at the edge or superficial rooting of the same. The lateral apertures and the enlargements 12 as well as the separation between the toothed sectors 4 permit of the horn being well inserted into the apparatus. This latter point is of much importance, since it allows of the cut being realized at the very same root of the horn which is thus being extirpated.

Having now described and ascertained the nature of my said invention and in what manner the same is to be performed, I declare that what I claim, is:

In a dehorning apparatus, a casing comprising two parallel side walls, each having an elongated opening through which a horn may project, a guide ring on the casing at the lower ends of said openings adapted to embrace a horn, semi-circular knives having their cutting edges perpendicular to the plane of the ring and slidably mounted in the casing between the side walls at right-angles to each other, knife operating levers pivoted on said side walls on each side of the openings and having toothed sectors on their lower bent ends engaging racks on the knives, whereby the latter are moved through the guide-ring and their cutting edges brought into engagement, and means for producing simultaneous movement of the levers arranged above the elongated openings.

In testimony whereof I affix my signature in presence of two witnesses.

GERALD ARTHUR WINDUS.

Witnesses:
ANTONIO L. BELLO,
DOCTOR R. HEFFTER.

Copies of this patent may be obtained for five cents each, by addressing the "Commissioner of Patents, Washington, D. C."